United States Patent
Oshiumi (10) Patent No.: US 10,926,621 B2
(45) Date of Patent: Feb. 23, 2021

(54) CONTROL SYSTEM FOR HYBRID VEHICLES

(71) Applicant: TOYOTA JIDOSHA KABUSHIKI KAISHA, Toyota (JP)

(72) Inventor: Yasuhiro Oshiumi, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/690,287

(22) Filed: Nov. 21, 2019

(65) Prior Publication Data

US 2020/0189381 A1 Jun. 18, 2020

(30) Foreign Application Priority Data

Dec. 13, 2018 (JP) .............................. JP2018-233336

(51) Int. Cl.
| | |
|---|---|
| *B60K 6/365* | (2007.10) |
| *B60W 20/40* | (2016.01) |
| *B60K 6/387* | (2007.10) |
| *B60K 6/445* | (2007.10) |
| *B60K 6/38* | (2007.10) |

(52) U.S. Cl.
CPC .............. *B60K 6/365* (2013.01); *B60K 6/387* (2013.01); *B60K 6/445* (2013.01); *B60W 20/40* (2013.01); *B60K 2006/381* (2013.01); *B60W 2510/084* (2013.01)

(58) Field of Classification Search
CPC ........ B60K 6/365; B60K 6/387; B60K 6/445; F16H 3/725; F16H 2059/405; F16H 59/48; F16H 59/54; F16H 59/70; F16H 61/0213; F16H 2061/0234; F16H 2312/16; F16H 2312/18
See application file for complete search history.

(56) References Cited

U.S. PATENT DOCUMENTS

| | | | | |
|---|---|---|---|---|
| 5,934,395 | A * | 8/1999 | Koide ..................... | B60L 50/16 180/65.235 |
| 2004/0242370 | A1* | 12/2004 | Iwatsuki ........... | F16H 61/66272 477/45 |
| 2016/0257297 | A1* | 9/2016 | Oshiumi ................. | B60L 15/20 |
| 2016/0368361 | A1 | 12/2016 | Endo et al. | |

FOREIGN PATENT DOCUMENTS

JP 2017-007437 A 1/2017

* cited by examiner

*Primary Examiner* — Edwin A Young
(74) *Attorney, Agent, or Firm* — Oblon, McClelland, Maier & Neustadt, L.L.P.

(57) ABSTRACT

A control system for a hybrid vehicle configured to prevent an excessive drop in an engine speed and while reducing vibrations when decelerating the vehicle abruptly. When an abrupt decelerating operation is detected in the fixed mode, a controller shifts an operating mode from the fixed mode to the high mode or the low mode by disengaging one of engagement devices in which a torque applied thereto in the fixed mode is reduced smaller by an inertia torque of the motor resulting from the decelerating operation.

6 Claims, 7 Drawing Sheets

| Operating Mode | | CL1 | CL2 | B1 |
|---|---|:---:|:---:|:---:|
| HV Mode | HV-Lo Mode | ● | – | – |
| | HV-Hi Mode | – | ● | – |
| | Fixed Mode | ● | ● | – |
| EV Mode | Dual-Motor Mode  EV-Lo Mode | ● | – | ● |
| | Dual-Motor Mode  EV-Hi Mode | – | ● | ● |
| | Single-Motor Mode | – | – | – |

CONTROL SYSTEM FOR HYBRID VEHICLES

CROSS-REFERENCE TO RELATED APPLICATIONS

The present disclosure claims the benefit of Japanese Patent Application No. 2018-233336 filed on Dec. 13, 2018 with the Japanese Patent Office, the disclosures of which are incorporated herein by reference in its entirety.

BACKGROUND

Field of the Disclosure

An embodiment of the present disclosure relates to the art of a control system for a hybrid vehicle in which a prime mover includes a motor and an engine, and in which a speed of the engine can be controlled by a motor.

Discussion of the Related Art

JP-A-2017-007437 describes one example of a two-motor type hybrid vehicle of this kind. In the hybrid vehicle taught by JP-A-2017-007437, an engine torque is distributed to a first motor and an output side through a power split mechanism. Specifically, in a hybrid mode, a speed of the engine is controlled by the first motor, and an electricity generated by the first motor is supplied to a second motor. A torque generated by the second motor is added to an output torque from the power split mechanism.

The power split mechanism of the hybrid vehicle described in JP-A-2017-007437 includes two sets of planetary gear units and a plurality of engagement devices, and an operating mode is changed by manipulating the engagement devices. According to the teachings of JP-A-2017-007437, the operating mode is selected from a high mode in which the engine speed is lowered, a low mode in which the engine speed is increased, and a fixed mode in which the power split mechanism is rotated entirely integrally. Specifically, the fixed mode is established by engaging a high clutch engaged to establish the high mode and a low clutch engaged to establish the low mode. In the hybrid vehicle taught by JP-A-2017-007437, therefore, the operating mode can be shifted smoothly between the high mode and the low mode via the fixed mode while maintaining a drive torque during transitional state of a shifting operation. In addition, in the fixed mode, the engine torque will not be translated entirely into electricity, and delivered to drive wheels without translated inversely into electricity. In the hybrid vehicle taught by JP-A-2017-007437, therefore, the engine torque can be delivered to the drive wheels efficiently.

In the conventional hybrid vehicle of this kind, the engine and the motor can be operated at an energy efficient point respectively to improve power transmission efficiency by thus shifting the operating mode between the high mode and the low mode via the fixed mode. However, in the fixed mode, the power split mechanism in which an input side is connected to the engine and an output side is connected to the drive wheels is rotated integrally. In the fixed mode, therefore, a speed of the engine is reduced with a reduction in a speed of the vehicle when e.g., a brake pedal is depressed. That is, an engine stall may be caused if the speed of the vehicle is reduced abruptly, or if a timing to shift the operating mode from the fixed mode is delayed. In addition, vibration will be increased due to such abrupt reduction in the speed of the engine when stopping and starting the engine.

SUMMARY

Aspects of the present disclosure have been conceived noting the foregoing technical problems, and it is therefore an object of the present disclosure to provide a control system for a hybrid vehicle configured to shift an operating mode from the fixed mode with proper timing to prevent an excessive reduction in an engine speed, when decelerating the hybrid vehicle abruptly.

The control system according to the exemplary embodiment of the present disclosure is applied to a hybrid vehicle, comprising: a power split mechanism that performs a differential action among a first rotary element connected to an engine, a second rotary element connected to a motor, and a third rotary element connected to a drive wheel; a first engagement device that is engaged to establish a high mode in which a rotational speed of the first rotary element is reduced lower than a rotational speed of the third rotary element given that a rotation of the second rotary element is stopped; and a second engagement device that is engaged to establish a low mode in which the rotational speed of the first rotary element is increased higher than the rotational speed of the third rotary element given that the rotation of the second rotary element is stopped. In the hybrid vehicle, a ratio of a rotational speed of the engine to the rotational speed of the third rotary element is changed in accordance with a rotational speed of the motor in the high mode and the low mode, and a fixed mode in which said ratio is fixed to a constant value is established by engaging both of the first engagement device and the second engagement device. In order to achieve the above-explained objective, according to the embodiment of the present disclosure, the control system is provided with a controller that controls the engine, the motor, the first engagement device, and the second engagement device. Specifically, the controller is configured to: detect an abrupt decelerating operation in the fixed mode; and shift an operating mode from the fixed mode to any one of the high mode and the low mode by disengaging any one of the first engagement device and the second engagement device in which a torque applied thereto in the fixed mode is reduced smaller by an inertia torque of the motor resulting from the decelerating operation, in a case that the abrupt decelerating operation is detected.

In a non-limiting embodiment, the controller may be further configured to change a torque of the motor in a direction to reduce the torque applied to said one of the first engagement device and the second engagement device in the fixed mode, after the lapse of predetermined period of time from a point at which a command to disengage said one of the first engagement device and the second engagement device has been transmitted.

In a non-limiting embodiment, the controller may be further configured to: reduce the torque of the motor after changing the torque of the motor in the direction to reduce the torque applied to said one of the first engagement device and the second engagement device in the fixed mode; and reduce the torque of the motor less than a reference torque after the rotational speed of the engine has been reduced to a predetermined speed.

In a non-limiting embodiment, said one of the first engagement device and the second engagement device includes a dog clutch that transmits torque by engaging dog teeth.

Thus, in the case that the hybrid vehicle is decelerated abruptly in the fixed mode, the control system according to the embodiment of the present disclosure disengages any one of the engagement devices to shift the operating mode from the fixed mode to the high mode or low mode in which a speed of the engine can be controlled by the motor. According to the embodiment of the present disclosure, therefore, activation of the engine can be maintained even if the hybrid vehicle is stopped. For this reason, an occurrence of engine stall can be prevented even if the speed of the engine drops abruptly when decelerating the hybrid vehicle strongly. Further, since the operating mode is shifted from the fixed mode to the mode in which the speed of the engine can be controlled, the engine can be stopped in an appropriate condition to be started again. For example, when the engine is stopped, a crank angle of the engine can be controlled to an appropriate angle to start the engine again. For this reason, vibrations can be reduced when starting the engine. To this end, specifically, one of the engagement devices in which a torque applied thereto in the fixed mode is reduced smaller when decelerating the hybrid vehicle is disengaged. According to the embodiment of the present disclosure, therefore, the operating mode can be shifted promptly from the fixed mode to another mode when decelerating the vehicle abruptly without reducing the speed of the engine excessively and without increasing vibrations.

In addition, after the lapse of the predetermined period of time from the point at which the command to disengage one of the engagement devices has been transmitted, the torque of the motor is changed in the direction to reduce the torque applied to one of the engagement devices to be disengaged in the fixed mode. According to the embodiment of the present disclosure, therefore, the engagement device can be disengaged quickly to shift the operating mode promptly from the fixed mode to another mode.

Further, after shifting the operating mode from the fixed mode to another mode, the speed of the engine can be maintained to the low speed by the motor. According to the embodiment of the present disclosure, therefore, the speed of the engine will not be reduced excessively, and hence vibrations will not be increased. Furthermore, if the engine is to be stopped, a crank angle of the engine can be adjusted to the appropriate angle to start the engine again. For this reason, vibrations can be reduced when starting the engine.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
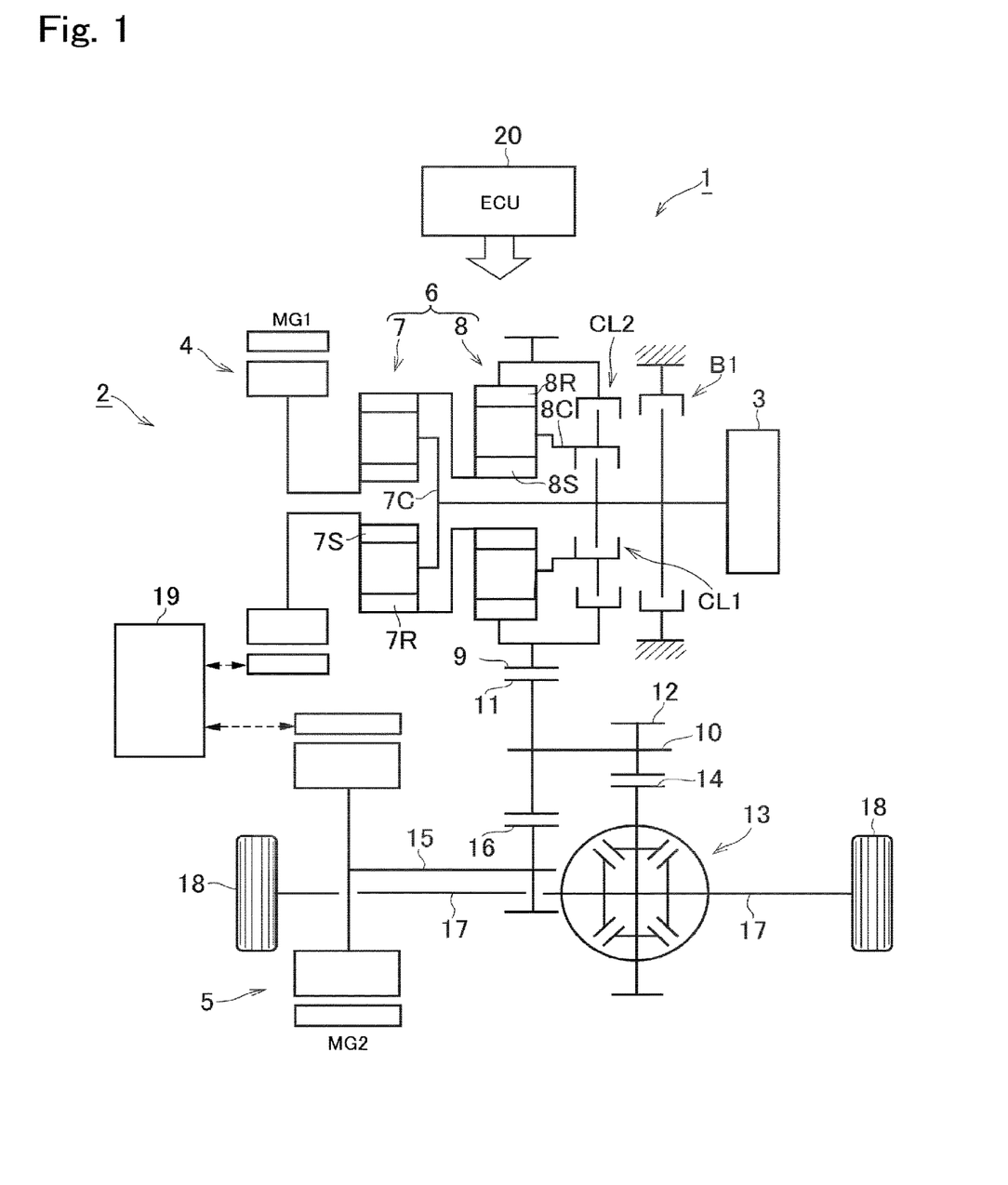
FIG. 1 is a skeleton diagram schematically showing a structure of a powertrain of a hybrid vehicle to which the control system according to the embodiment of the present disclosure is applied.

Preferred embodiments of the present application will now be explained with reference to the accompanying drawings. Referring now to FIG. 1 there is shown one example of a structure of a powertrain 2 of a hybrid vehicle (as will be simply called the "vehicle" hereinafter) 1 to which a control system according to the embodiment of the present disclosure is applied. A prime mover of the vehicle 1 includes an engine 3, a first motor (referred to as MG1 in the drawings), 4 and a second motor (referred to as MG2 in the drawings) 5. For example, a gasoline engine and a diesel engine may be adopted as the engine 3, and an opening degree of a throttle valve, a fuel injection, an ignition timing etc. of the engine 3 may be controlled electrically. The first motor 4 as a motor of the embodiment is used mainly to control a speed of the engine 3, and a motor-generator is adopted as the first motor 4. On the other hand, the second motor 5 is operated mainly as a motor to generate a drive force to propel the vehicle 1 by supplying electricity generated by the first motor 4 to the second motor 5. A motor-generator is also adopted as the second motor 5 so that electricity is regenerated by the second motor 5 during deceleration of the vehicle 1.

In order to control the speed of the engine 3 by the first motor 4, and to translate an output power of the engine 3 partially into electric power, the vehicle 1 is provided with a power split mechanism 6. The power split mechanism 6 is a complex planetary gear unit formed by combining a first planetary gear unit 7 with a second planetary gear unit 8. Specifically, the first planetary gear unit 7 is a single-pinion planetary gear unit adapted to perform a differential action, comprising: a sun gear 7S; a ring gear 7R as an internal gear arranged concentrically with the sun gear 7S; a plurality of pinion gears interposed between the sun gear 7S and the ring gear 7R while being meshed with both gears 7S and 7R; and a carrier 7C supporting the pinion gears in a rotatable manner. Likewise, the second planetary gear unit 8 is also a single-pinion planetary gear unit adapted to perform a differential action, comprising: a sun gear 8S; a ring gear 8R as an internal gear arranged concentrically with the sun gear 8S; a plurality of pinion gears interposed between the sun gear 8S and the ring gear 8R while being meshed with both gears 8S and 8R; and a carrier 8C supporting the pinion gears in a rotatable manner.

In the first planetary gear unit 7, the carrier 7C is connected to the engine 3 to serve as an input element, and the sun gear 7S is connected to the first motor 4 to serve as a reaction element. The first planetary gear unit 7 is arranged coaxially with the second planetary gear unit 8, and the ring gear 7R of the first planetary gear unit 7 is joined to the sun gear 8S of the second planetary gear unit 8 to be rotated integrally therewith. An output gear 9 is formed around the ring gear 8R of the second planetary gear unit 8 so that the ring gear 8R serves as an output element.

In the power split mechanism 6, the carrier 7C and the carrier 8C are selectively connected to each other by engaging a first clutch CL1, and the ring gear 8R and the carrier 8C are selectively connected to each other by engaging a second clutch CL2. That is, the second planetary gear unit 8 is rotated integrally by engaging the second clutch CL2. For example, a friction clutch and a dog clutch may be adopted as the first clutch CL1 and the second clutch CL2 respectively, and in order to downsize the power split mechanism 6, it is preferable to use the dog clutch as the first clutch CL1 and the second clutch CL2. Each of the first clutch CL1 and the second clutch CL2 may be actuated not only by a hydraulic actuator but also by an electromagnetic actuator.

A counter shaft 10 extends parallel to a common rotational axis of the engine 3 and the power split mechanism 6. A driven gear 11 is fitted onto one end of the counter shaft 10 to be meshed with the output gear 9, and a drive gear 12 that is diametrically smaller than the driven gear 11 is fitted onto the other end of the counter shaft 10 to be meshed with a ring gear 14 of a differential gear unit 13 as a final reduction.

The driven gear 11 is also meshed with a drive gear 16 fitted onto a rotor shaft 15 of the second motor 5 so that an output torque of the second motor 5 is synthesized with a torque of the output gear 9 at the driven gear 11 to be distributed from the differential gear unit 13 to drive wheels 18 via each drive shaft 17.

The vehicle 1 may be propelled in a hybrid mode (to be abbreviated as the "HV mode" hereinafter) in which the second motor 5 is driven by the electricity generated by the first motor 4, and an electric vehicle mode (to be abbreviated as the "EV mode" hereinafter) in which the first motor 4 and the second motor 5 are driven by the electricity supplied from a power source 19. To this end, the first motor 4 and the second motor 5 are individually connected to the power source 19 including an inverter, a converter, and a battery. In order to startup the engine 3, the engine 3 may be cranked by the first motor 4.

In order to control the engine 3, the power source 19, the clutches CL1 and CL2, a brake B1 and so on, the hybrid vehicle 1 is provided with an electronic control unit (to be abbreviated as the "ECU" hereinafter) 20 as a controller. The ECU 20 comprises a microcomputer as its main constituent configured to execute a calculation based on incident data, and transmits a calculation result in the form of command signal. The ECU 20 may be formed by integrating dedicating ECUs for the engine 3, the power source 19 and so on. A structure and function of the ECU 20 are shown in FIG. 2 in more detail.

Figure 2:
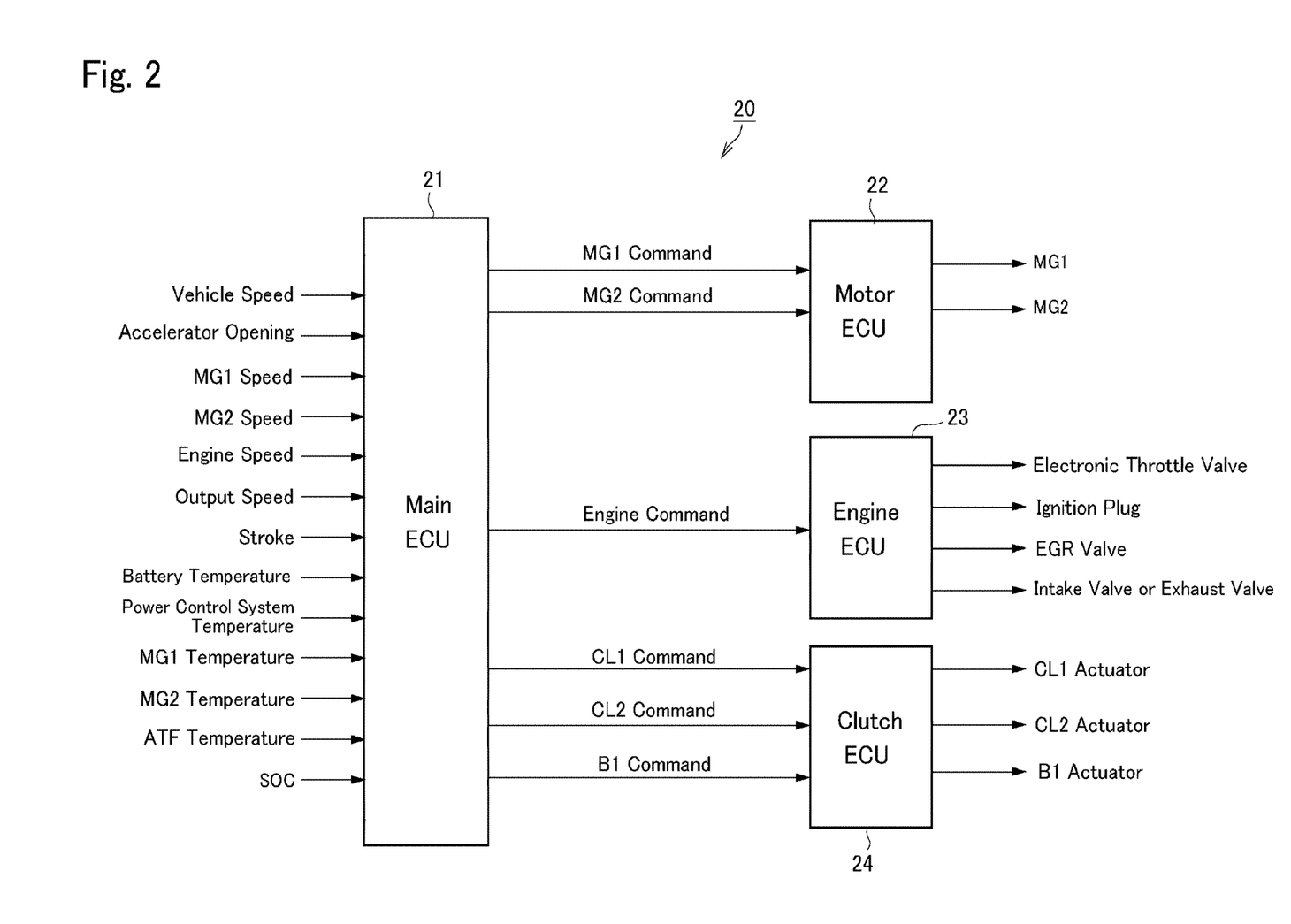
FIG. 2 is a block diagram showing a structure of an electronic control unit.

As shown in FIG. 2, the ECU 20 comprises a main ECU 20, a motor ECU 22 that controls the first motor 4 and the second motor 5, an engine ECU 23 that controls the engine 3, and a clutch ECU 24 that controls the first clutch CL1, the second clutch CL2, and the brake B1. To the main ECU 21, various data is transmitted from sensors (not shown). For example, the main ECU 21 receives data about: a vehicle speed; a position (or depression) of an accelerator pedal (not shown); a speed of the first motor 4; a speed of the second motor 5; a speed of the engine 3; an output speed; strokes of the clutches CL1, CL2, and the brakes B1; a temperature of the battery; a temperature of the power source 19; a temperature of the first motor 4; a temperature of the second motor 5; a temperature of oil (i.e., ATF); and a state of charge (to be abbreviated as the "SOC" hereinafter) level of the battery. The main ECU 21 transmits command signals of output torques and speeds of the first motor 4 and the second motor 5 to the motor ECU 22, command signals of an output torque and a speed of the engine 3 to the engine ECU 23, and command signals of engagement and disengagement of the clutches CL1, CL2 and the brake B1 to the clutch ECU 24. The motor ECU 22 controls torques and rotational speeds of the first motor 4 and the second motor 5 based on the incident signals so that each of the first motor 4 and the second motor 5 is selectively operated as a motor and a generator. The engine ECU 23 controls: opening degrees and valve timings of an electronic throttle valve, an exhaust gas restriction valve; an intake valve or an exhaust valve; and an ignition timing of an ignition plug. The clutch ECU 24 controls actuators of the clutches CL1, CL2 and the brake B1.

Figure 3:
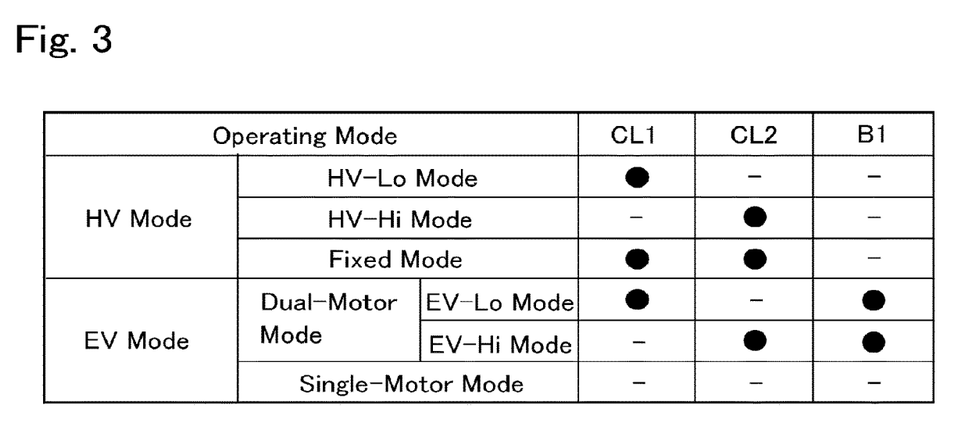
FIG. 3 is a table showing engagement states of engagement devices in each operating mode.

In the power split mechanism 6, a torque transmitting route is changed depending on engagement states of the first clutch CL1, the second clutch CL2, and the brake B1, and a drive torque and a speed of the engine 3 are changed by changing the torque transmitting route. FIG. 3 shows engagement states of the first clutch CL1, the second clutch CL2, and the brake B1, in each operating mode. In FIG. 3, "●" represents that the engagement device is in engagement, and "-" represents that the engagement device is in disengagement. As described, the operating mode of the vehicle 1 may be selected from the HV mode in which the engine 3 is activated to propel the vehicle 1, and the EV mode in which the vehicle 1 is powered by the electricity supplied from the power source 19.

Figure 4:
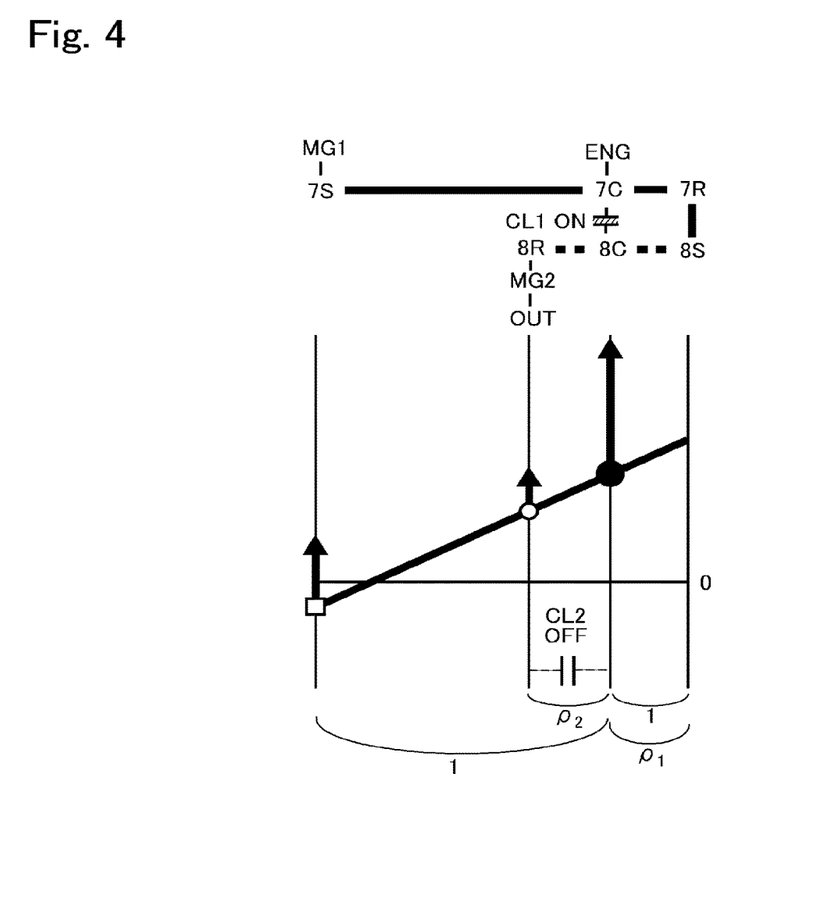
FIG. 4 is a nomographic diagram showing a situation in the low mode.
Figure 5:
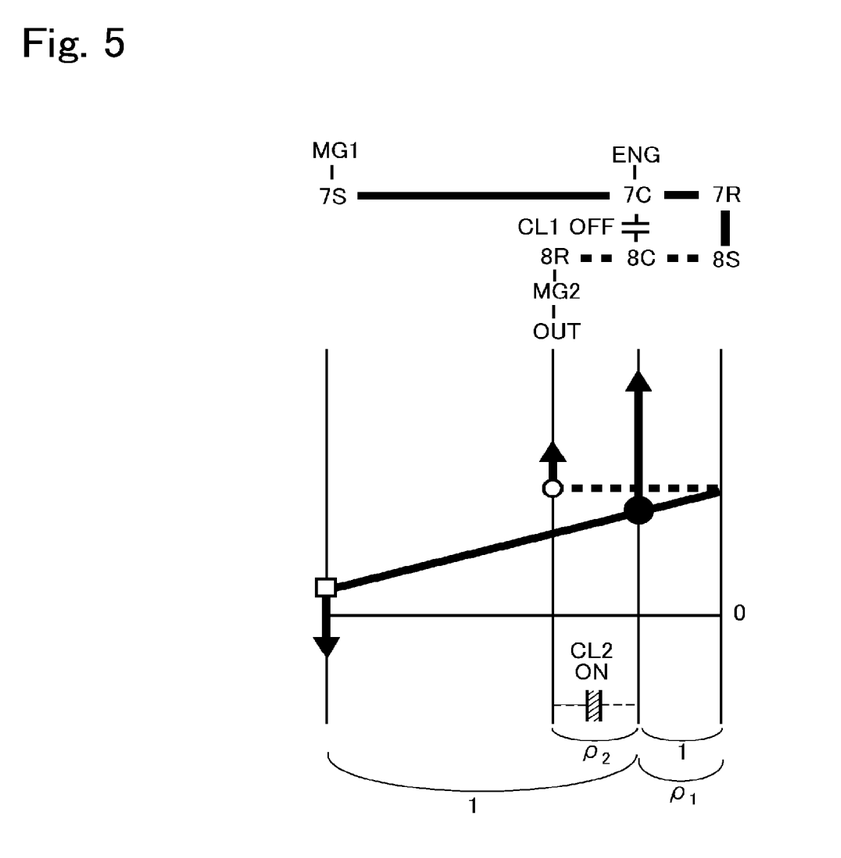
FIG. 5 is a nomographic diagram showing a situation in the high mode.
Figure 6:
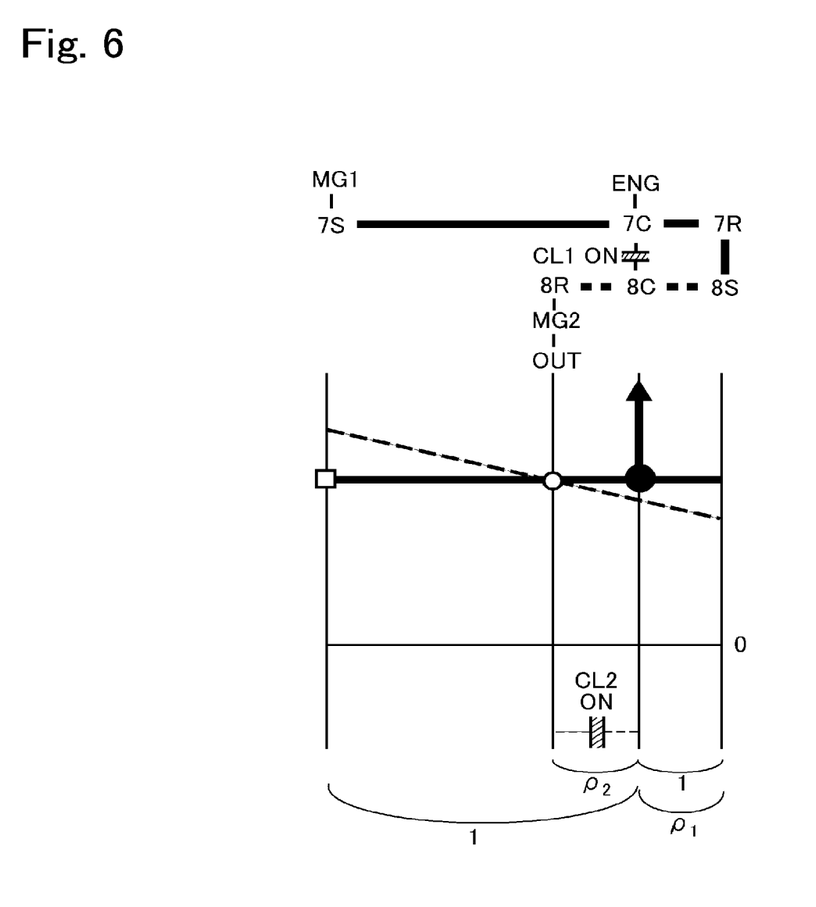
FIG. 6 is a nomographic diagram showing a situation in the fixed mode.

Specifically, the HV mode may be selected from a low mode (referred to as "HV-Low mode" in FIG. 3), a high mode (referred to as "HV-High mode" in FIG. 3), and a fixed mode. The low mode is established by engaging only the first clutch CL1, and rotational speeds of the rotary elements of the power split mechanism 6 in the low mode are indicated in FIG. 4. In the nomographic diagram shown in FIGS. 4 to 6, distances among the vertical lines are set based on a gear ratio $\rho 1$ between a teeth number of the sun gear 7S and a teeth number of the ring gear 7R, and a gear ratio $\rho 2$ between a teeth number of the sun gear 8S and a teeth number of the ring gear 8R. A vertical distance on the vertical line from the horizontal base line represents a rotational speed of the rotary member, and an operating condition of the power split mechanism 6 is indicated by connecting the rotational speeds of the rotary elements. As can be seen from FIG. 4, given that a rotational speed of the first motor 4 is zero (to operate the power split mechanism 6 at a mechanical point) in the low mode, a rotational speed of the engine 3 is increased higher than a rotational speed of the output gear 9 (or the ring gear 8R of the second planetary gear unit 8). The high mode is established by engaging only the second clutch CL2, and rotational speeds of the rotary elements of the power split mechanism 6 in the high mode are indicated in FIG. 5. In FIG. 5, the thick solid line indicates an operating condition of the first planetary gear unit 7, and the dashed line indicates an operating condition of the second planetary gear unit 8. In the high mode, given that a rotational speed of the first motor 4 is zero, a rotational speed of the output gear 9 (or the ring gear 8R of the second planetary gear unit 8) is increased higher than a rotational speed of the engine 3. The fixed mode is established by engaging both of the first clutch CL1 and the second clutch CL2, and rotational speeds of the rotary elements of the power split mechanism 6 in the fixed mode are indicated in FIG. 6. As described, the second planetary gear unit 8 is rotated integrally by engaging the second clutch CL2, and the ring gear 7R and the sun gear 7S of the first planetary gear unit 7 are connected to each other through the second planetary gear unit 8 by engaging the first clutch CL1. Consequently, the first planetary gear unit 7 and the second planetary gear unit 8 are rotated integrally so that the power split mechanism 6 is rotated entirely integrally. In the fixed mode, therefore, the rotary elements of the power split mechanism 6 are rotated at a same speed as indicated by the thick solid line extending parallel to the base line.

The EV mode may be selected from a dual-motor mode in which each of the first motor 4 and the second motor 5 is operated as a motor to propel the vehicle 1, and a single-motor mode in which only the second motor 5 is operated as a motor to propel the vehicle 1. The dual-motor mode may be further selected from an electric vehicle-low mode (referred to as "EV-Low mode" in FIG. 3), and an electric vehicle-high mode (referred to as "EV-High mode" in FIG. 3). Specifically, the low mode is established by engaging the brake B1 in addition to the first clutch CL1, and the high mode is established by engaging the brake B1 in addition to the second clutch CL2. In the single-motor mode, in order to prevent the first motor 4 from being rotated passively, all of the first clutch CL1, the second clutch CL2, and the brake B1 are disengaged.

A drive force to propel the vehicle 1, a fuel consumption, an electric consumption etc. are varied in those operating modes. Therefore, the operating mode of the vehicle 1 is selected depending on conditions of the vehicle 1 such as a required drive force governed by a position of the accelerator pedal, a speed of the vehicle 1, an SOC level of the battery and so on. For example, the operating mode may be selected with reference to a map determining selecting regions of those operating mode based on a speed of the vehicle 1 and a position of the accelerator pedal.

In the fixed mode of the HV mode, the drive wheels 18 are driven by the engine 3, and a speed ratio between the engine 3 and the drive wheels 18 (or the output gear 9) is fixed to a constant value. Therefore, if a brake pedal (not shown) is depressed abruptly by the driver to decelerate the vehicle 1 strongly in the fixed mode, a rotational speed of the engine 3 will be reduced abruptly with a reduction in the rotational speed of the drive wheels 18, and an engine stall is expected to be caused. In order to prevent an occurrence of such engine stall, the ECU 20 executes a routine shown in FIG. 7.

Figure 7:
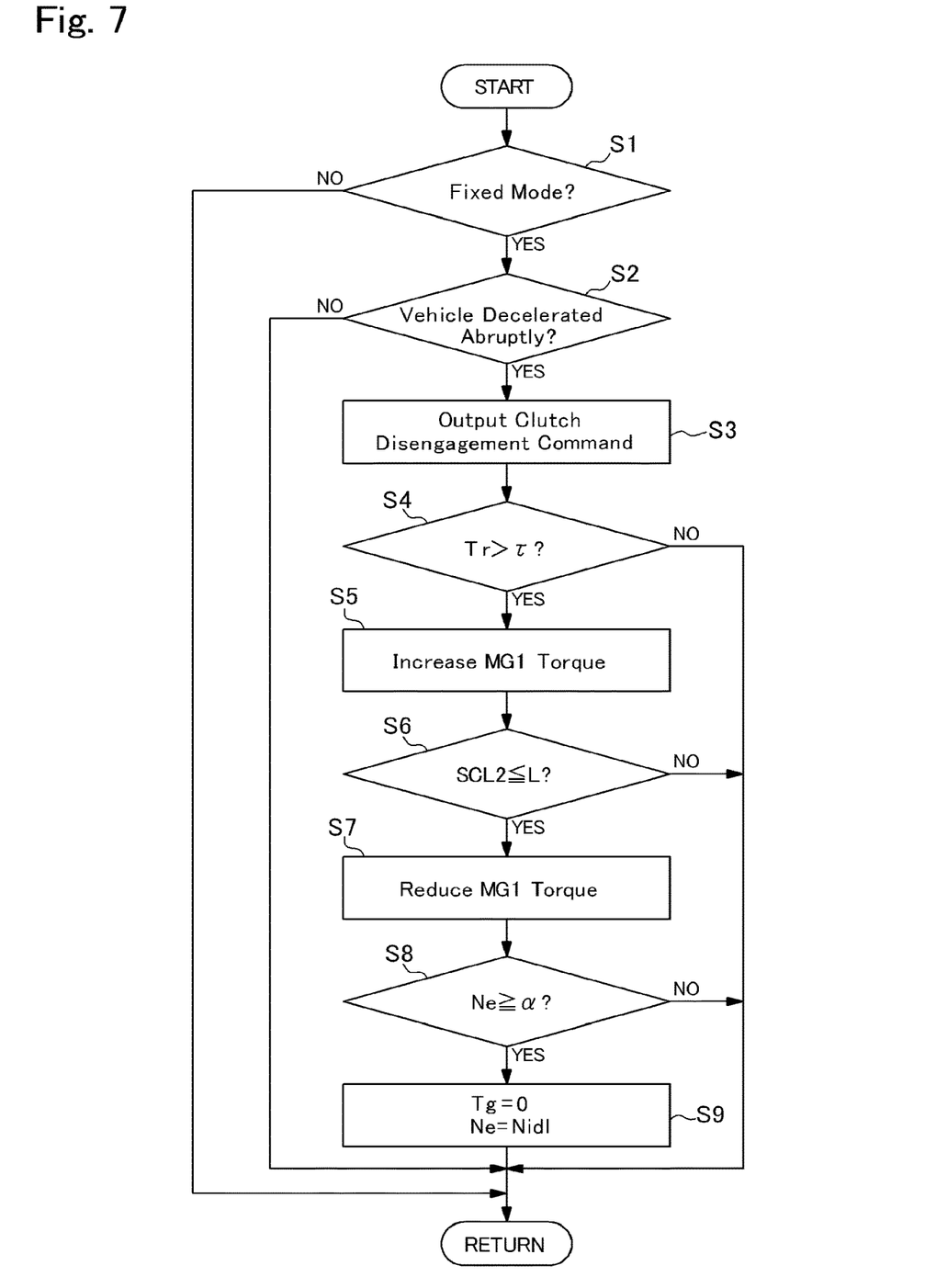
FIG. 7 is a flowchart showing an example of a routine executed by the control system according to the exemplary embodiment.

The routine shown in FIG. 7 is repeated at predetermined time intervals during propulsion of the vehicle 1. At step S1, it is determined whether the vehicle 1 is propelled in the fixed mode. If the vehicle 1 is not propelled in the fixe mode so that the answer of step S1 is NO, the routine returns without carrying out any specific control. By contrast, if the vehicle 1 is propelled in the fixe mode so that the answer of step S1 is YES, the routine progresses to step S2 to determine whether the vehicle 1 is decelerated abruptly. For example, such determination at step S2 may be made based on a fact that a pedal force applied to the brake pedal is greater than a predetermined value, or that a depressing speed of the brake pedal is faster than a predetermined value. In addition, such determination at step S2 may also be made based on a detection value of an acceleration sensor (not shown), a change rate (or angular velocity) of a rotational speed of a predetermined rotary member, a command signal transmitted from an autonomous operation system to decelerate the vehicle 1 abruptly, and other related command signals. If the vehicle 1 is not decelerated abruptly so that the answer of step S2 is NO, the routine returns without carrying out any specific control.

By contrast, if the vehicle 1 is decelerated abruptly so that the answer of step S2 is YES, the routine progresses to step S3 to output a command signal to disengage one of the first clutch CL1 and the second clutch CL2. That is, at step S3, a command signal to shift the operating mode from the fixed mode to another mode is transmitted. Specifically, the operating mode will be shifted from the fixed mode to the low mode or the high mode, and for this purpose, any one of the first clutch CL1 and the second clutch CL2 being engaged in the fixed mode will be disengaged. In order to prevent an occurrence of engine stall, such shifting operation of the operating mode has to be executed promptly. For this purpose, one of the clutches CL1 and CL2 in which a reduction amount of torque applied thereto in the fixed mode when decelerating the vehicle 1 is larger is selected to be disengaged.

As a result of decelerating the vehicle 1 abruptly in the fixed mode, a rotational speed of the output gear 9 formed integrally with the ring gear 8R of the second planetary gear unit 8 is reduced abruptly. In this situation, the first motor 4 connected to the sun gear 7S of the first planetary gear unit 7 is subjected to a force acting in a direction to reduce a rotational speed of the first motor 4. However, an inertia torque derived from an inertia moment of the first motor 4 acts as a resistance force to maintain the rotational speed of the first motor 4. In this situation, specifically, rotational speeds of the rotary elements of the power split mechanism 6 are changed by a change in the force applied to the power split mechanism 6 in such a manner that the thick solid line shown in FIG. 6 is inclined diagonally from top left to bottom right. In the fixed mode, the torque is applied to the first clutch CL1 in accordance with the gear ratio ρ1 of the first planetary gear unit 7, and the torque is applied to the second clutch CL2 in accordance with the gear ratio ρ2 of the second planetary gear unit 8. Specifically, the torque TCL1 applied to the first clutch CL1 in the fixed mode, and the torque TCL2 applied to the second clutch CL2 in the fixed mode are expressed as:

$$TCL1 = (1 - \rho 1 \cdot \rho 2) Tg / \rho 1 \cdot \rho 2 - Te; \text{ and}$$

$$TCL2 = -(1 + \rho 1) Tg / \rho 1 - Te,$$

where Tg is a torque of the first motor 4, and Te is a torque of the engine 3. Given that both of the gear ratios ρ1 and ρ2 are smaller than 0.5, in the fixed mode, the torque applied to the second clutch CL2 as a high clutch to be engaged to establish the high mode is smaller than the torque applied to the first clutch CL1 as a low clutch to be engaged to establish the low mode. Accordingly, if the power split mechanism 6 is structured such that both of the gear ratios ρ1 and ρ2 are smaller than 0.5, a command signal to disengage the second clutch CL2 is transmitted at step S3.

Then, at step S4, it is determined whether an elapsed time Tr from a point at which the command signal to disengage e.g., the second clutch CL2 has been transmitted exceeds a predetermined period of time τ. The second clutch CL2 starts disengaging after the lapse of a predetermined period of time due to delays in transmission of the commend signal, actuation of the actuator and so on. Therefore, the predetermined period of time τ is set in advance taking account of such delays. If the elapsed time Tr has not yet exceeded the predetermined period of time τ so that the answer of step S4 is NO, the routine returns without carrying out any specific control. By contrast, if the elapsed time Tr has exceeded the predetermined period of time τ so that the answer of step S4 is YES, the routine progresses to step S5 to increase torque of the first motor 4 so as to expedite disengagement of the second clutch CL2. Given that a dog clutch is adopted as the second clutch CL2, dog teeth being engaged with each other may be disengaged easily from each other by reducing a torque applied to the dog teeth or an engagement pressure applied to the dog teeth. As described, an inclination of the thick solid line shown in FIG. 6 is increased and the torque applied to the second clutch CL2 in the fixed mode is reduced by applying a force to the sun gear 7S of the first planetary gear unit upwardly in FIG. 6. Therefore, in order to expedite disengagement of the second clutch CL2, the torque of the first motor 4 in the forward direction (i.e, in the rotational direction when the command signal to disengage the second clutch CL2 is transmitted) is increased when the force starts acting on the second clutch CL2 in a direction to disengage the second clutch CL2 after the lapse of the predetermined period of time τ.

Given that the dog clutch is adopted as the second clutch CL2, a stroke of the actuator to engage the second clutch CL2 is longer than a stroke of the actuator to disengage the second clutch CL2. Accordingly, at step S6, it is determined whether a stroke of the actuator of the second clutch CL2 is equal to or shorter than a reference stroke L of the second clutch CL2 which is set to determine disengagement of the second clutch CL2. If the stroke of the actuator of the second clutch CL2 is longer than the reference stroke L, this means that the second clutch CL2 is still in engagement to establish the fixed mode. In this case, therefore, the answer of step S6 is NO and the routine returns to step S4 to repeat the controls of steps S4 and S5. By contrast, if stroke of the actuator of the second clutch CL2 is equal to or shorter than the reference stroke L so that the answer of step S6 is YES, this means that the second clutch CL2 is disengaged. Consequently, according to the example shown in FIG. 7, the operating mode is shifted from the fixed mode to the low mode in which the first clutch CL1 is engaged.

As described, the carrier 7C of the first planetary gear unit 7 serves as the input element connected to the engine 3, and the sun gear 7S of the first planetary gear unit 7 serves as the reaction element. In the low mode, therefore, a rotational speed of the carrier 7C is increased higher than a rotational speed of the output gear 9 formed integrally with the ring gear 8R of the second planetary gear unit 8 as explained with reference to FIG. 4, by reducing a rotational speed of the sun gear 7S or rotating the sun gear 7S in the backward direction by the first motor 4. That is, activation of the engine 3 can be maintained even if the vehicle 1 is stopped. In the case that the answer of step S6 is YES, therefore, the routine progresses to step S7 to reduce the rotational speed of the first motor 4 by reducing the torque of the first motor 4.

Consequently, a rotational speed Ne of the engine 3 is reduced with a reduction in the speed of the vehicle 1, and at step S8, it is determined whether the rotational speed Ne of the engine 3 is equal to or higher than a predetermined speed α set to a level at which vibrations will not be increased. Basically, a resonance point of the drive system including the engine 3 is set lower than an idling speed of the engine 3, and it is preferable to set the predetermined speed α higher than the resonance point. If the rotational speed Ne of the engine 3 is lower than the predetermined speed α so that the answer of step S8 is NO, the routine returns to step S4 to repeat the previous steps. By contrast, if the rotational speed Ne of the engine 3 is equal to or higher than the predetermined speed α so that the answer of step S8 is YES, the routine progresses to step S9 to reduce a torque Tg of the first motor 4 less than a reference torque (e.g., zero), and to maintain the rotational speed Ne of the engine 3 to an idling speed Nidl by idling the engine 3. Thereafter, the routine returns.

Figure 8:
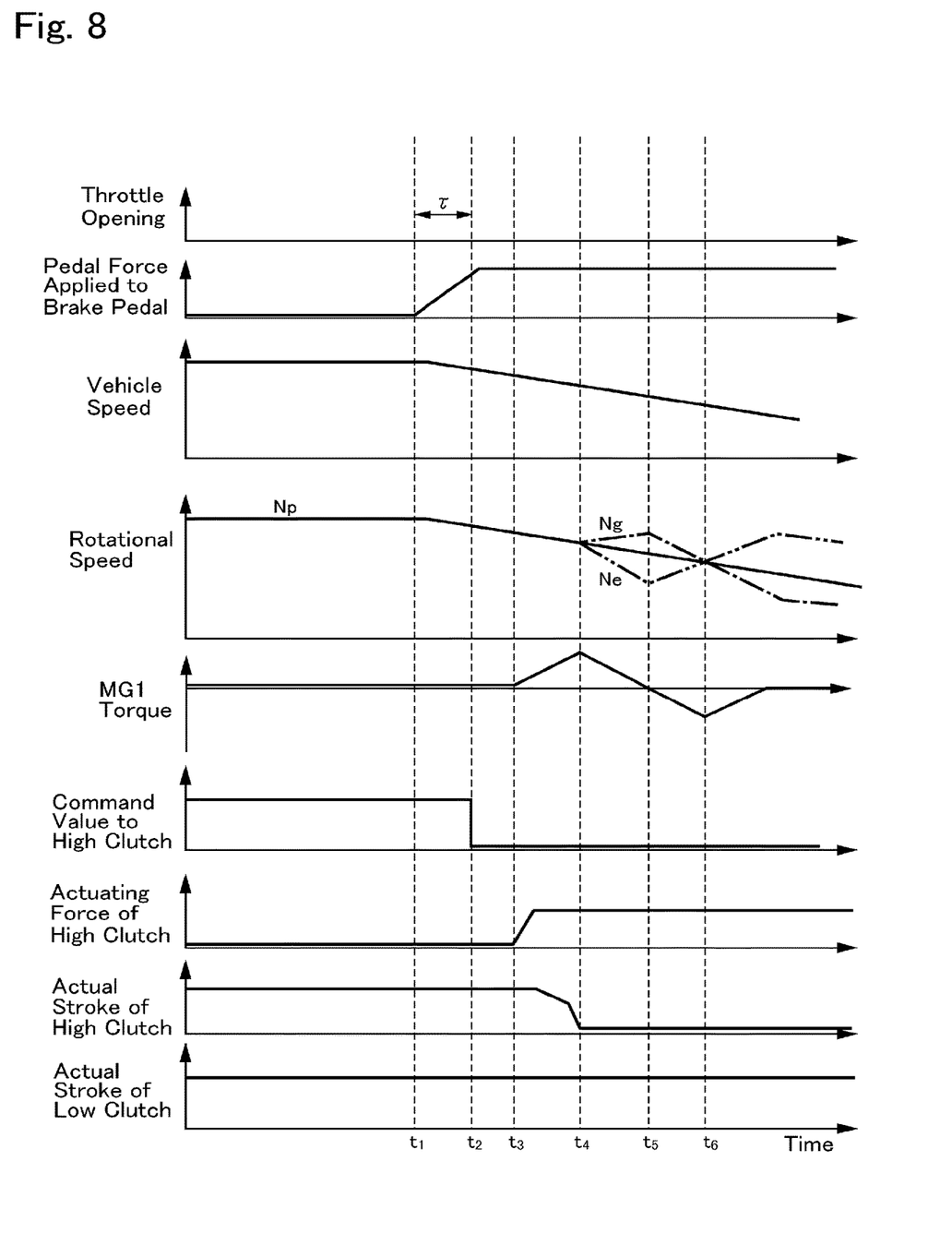
FIG. 8 is a time chart indicating temporal changes in conditions of the hybrid vehicle during execution of the routine in FIG. 7.

Temporal change in the situation of the vehicle 1 during execution of the routine shown in FIG. 7 is shown in FIG. 8. Specifically, FIG. 8 shows an example in which the brake pedal is depressed abruptly to decelerate the vehicle 1 strongly in the fixed mode during coasting of the vehicle 1. Therefore, an opening degree of the throttle valve is substantially zero. In this situation, actual strokes of the actuators of the first clutch CL1 (i.e., the low clutch) and the second clutch CL2 (i.e., the high clutch) are increased to the maximum extent to engage the first clutch CL1 and the second clutch CL2 thereby establishing the fixed mode. To this end, a command value to maintain the engagement of the second clutch CL2 is transmitted, and hence an actuation force of the actuator of the second clutch CL2 is zero. In this situation, the power split mechanism 6 is rotated entirely integrally at a speed indicated by the line Np, and the first motor 4 is not activated. That is, the torque of the first motor 4 is zero.

The brake pedal is depressed at point t1, and the pedal force applied to the brake pedal reaches the predetermined value at point t2. Consequently, the routine shown in FIG. 7 progresses from step S2 to step S3 to transmit the command signal to disengage the second clutch CL2. Then, after the lapse of the predetermined period of time τ, the disengagement force starts acting on the second clutch CL2 at point t3. Consequently, the routine shown in FIG. 7 progresses from step S4 to step S5 so that the torque of the first motor 4 starts increasing in the forward direction at a substantially same time with or immediately after the commencement of disengagement of the second clutch CL2.

As a result of thus increasing the torque of the first motor 4, the torque applied to the second clutch CL2 in the fixed mode is reduced, and hence the second clutch CL2 starts being actuated to be disengaged immediately after point t3. In the dog clutch, a friction acting between engagement surfaces of the dog teeth acts as a resistance. Therefore, a disengagement motion of the second clutch CL2 is slow in the initial phase of disengagement, but when the dog teeth are almost disengaged from each other, the disengagement motion of the second clutch CL2 is accelerated as indicated by the polygonal line in FIG. 8. When the actual stroke of the second clutch CL2 being disengaged is reduced to substantially zero at point t4, that is, the actuator of the second clutch CL2 is returned to a disengagement position at point t4, a determination of disengagement of the second clutch CL2 is made at step S6. Consequently, the operating mode of the vehicle 1 is shifted from the fixed mode to the low mode at point t4.

As a result, the torque of the first motor 4 is reduced so that the speed of the first motor 4 is reduced gradually. In this situation, since the first motor 4 is generating torque in the forward direction, a rotational speed Ng of the sun gear 7S (i.e., the reaction element) of the first planetary gear unit 7 connected to the first motor 4 is increased higher than a rotational speed Np of the output gear 9 formed integrally with the ring gear 8R (i.e., the output element) of the second planetary gear unit 8. By contrast, the rotational speed Ne of the carrier 7C (i.e., the input element) of the first planetary gear unit 7 connected to the engine 3 is reduced lower than the rotational speed Np of the output gear 9 formed integrally with the ring gear 8R. Such situation is indicated by the dashed line in FIG. 6.

Although the torque of the first motor 4 is reduced, the rotational speed Ng of the first motor 4 is increased as long as the first motor 4 generates the torque in the forward direction, and consequently the speed Ne of the engine 3 is reduced. When the torque of the first motor 4 is reduced to zero at point t5, the torque of the first motor 4 is reversed to the backward direction. In this situation, the rotational speed Ng of the first motor 4 is reduced gradually, and the rotational speed Ne of the engine 3 is increased gradually. As long as the first motor 4 generates the torque in the forward direction, an inclination of the dashed line shown in FIG. 6 is increased continuously, and is reduced gradually after the torque of the first motor 4 is reversed to the backward direction. Eventually, the dashed line shown in FIG. 6 becomes parallel to the base line so that the rotational speed Ng of the first motor 4 and the rotational speed Ne of the engine 3 are synchronized with the rotational speed Np of the output gear 9 at point t6. Consequently, the routine shown in FIG. 7 progresses from step S8 to step S9 to reduce the torque of the first motor 4 to zero, and to maintain the rotational speed Ne of the engine 3 to the idling speed. In this situation, therefore, the rotational speed Ng of the first motor 4 is governed by the speed of the vehicle 1 (i.e., the rotational speed of the output gear 9) and the rotational speed Ne of the engine 3.

Thus, in the case that the vehicle 1 is decelerated abruptly in the fixed mode, the control system according to the embodiment of the present disclosure shifts the operating mode of the vehicle 1 from the fixed mode to e.g., the low mode in which the speed of the engine 3 can be controlled. According to the embodiment of the present disclosure, therefore, the speed of the engine 3 will not be reduced excessively, and vibrations of the engine 3 will not be increased. To this end, specifically, one of the engagement devices to which the torque applied thereto in the fixed mode is smaller is selected to be disengaged. According to the embodiment of the present disclosure, therefore, the operating mode of the vehicle 1 can be shifted promptly from the fixed mode to another mode. Moreover, since the torque of the motor is varied in the direction to reduce the torque applied to the clutch to be disengaged in the fixed mode, delay in disengagement of the engagement device can be reduced as much as possible even if the dog clutch is adopted as the engagement device. According to the embodiment of the present disclosure, therefore, the operating mode of the vehicle 1 can be shifted smoothly from the fixed mode to another mode so as to prevent an excessive reduction in the speed of the engine 3 and an occurrence of engine stall. Further, since the operating mode is shifted from the fixed mode to the mode in which the speed of the engine 3 can be controlled, the engine 3 can be stopped in an appropriate condition to be started again even if the engine 3 is stopped temporarily. For this reason, vibrations can be reduced when starting the engine 3.

Although the above exemplary embodiments of the present disclosure have been described, it will be understood by those skilled in the art that the present disclosure should not be limited to the described exemplary embodiments, and various changes and modifications can be made within the scope of the present disclosure. For example, the operating mode may also be shifted from the fixed mode to the high mode according to need. Further, structure of the power split mechanism should not be limited to the above-explained structure as long as the operating mode to be shifted from the fixed mode can be selected from at least two modes.

What is claimed is:

1. A control system for a hybrid vehicle comprising:
   a power split mechanism that performs a differential action among a first rotary element connected to an engine, a second rotary element connected to a motor, and a third rotary element connected to a drive wheel;
   a first engagement device that is engaged to establish a high mode in which a rotational speed of the first rotary element is reduced lower than a rotational speed of the third rotary element given that a rotation of the second rotary element is stopped; and
   a second engagement device that is engaged to establish a low mode in which the rotational speed of the first rotary element is increased higher than the rotational speed of the third rotary element given that the rotation of the second rotary element is stopped,
   wherein a ratio of a rotational speed of the engine to the rotational speed of the third rotary element is changed in accordance with a rotational speed of the motor in the high mode and the low mode, and
   a fixed mode in which said ratio is fixed to a constant value is established by engaging both of the first engagement device and the second engagement device,
   the control system comprising:
   a controller that controls the engine, the motor, the first engagement device, and the second engagement device,
   wherein the controller is configured to
   detect an abrupt decelerating operation in the fixed mode, and
   shift an operating mode from the fixed mode to any one of the high mode and the low mode by disengaging any one of the first engagement device and the second engagement device in which a torque applied thereto in the fixed mode is reduced smaller by an inertia torque of the motor resulting from the decelerating operation, in a case that the abrupt decelerating operation is detected.

2. The control system for the hybrid vehicle as claimed in claim 1, wherein the controller is further configured to change a torque of the motor in a direction to reduce the torque applied to said one of the first engagement device and the second engagement device in the fixed mode, after a lapse of a predetermined period of time from a point at which a command to disengage said one of the first engagement device and the second engagement device has been transmitted.

3. The control system for the hybrid vehicle as claimed in claim 2, wherein the controller is further configured to
   reduce the torque of the motor after changing the torque of the motor in the direction to reduce the torque applied to said one of the first engagement device and the second engagement device in the fixed mode, and
   reduce the torque of the motor less than a reference torque after the rotational speed of the engine has been reduced to a predetermined speed.

4. The control system for the hybrid vehicle as claimed in claim 3, wherein said one of the first engagement device and the second engagement device includes a dog clutch that transmits torque by engaging dog teeth.

5. The control system for the hybrid vehicle as claimed in claim 2, wherein said one of the first engagement device and the second engagement device includes a dog clutch that transmits torque by engaging dog teeth.

6. The control system for the hybrid vehicle as claimed in claim 1, wherein said one of the first engagement device and the second engagement device includes a dog clutch that transmits torque by engaging dog teeth.

* * * * *